United States Patent
Tervonen et al.

(10) Patent No.: US 11,342,959 B2
(45) Date of Patent: May 24, 2022

(54) POSITIONING TRANSMISSION OF A PACKET

(71) Applicant: Arm Limited, Cambridge (GB)

(72) Inventors: Mika Antero Tervonen, Oulu (FI); Jarkko Paso, Oulu (FI)

(73) Assignee: Arm Limited, Cambridge (GB)

( * ) Notice: Subject to any disclaimer, the term of this patent is extended or adjusted under 35 U.S.C. 154(b) by 49 days.

(21) Appl. No.: 16/206,219

(22) Filed: Nov. 30, 2018

(65) Prior Publication Data

US 2020/0177231 A1   Jun. 4, 2020

(51) Int. Cl.
| | | |
|---|---|---|
| H04B 1/713 | (2011.01) | |
| H04W 28/02 | (2009.01) | |
| H04W 28/04 | (2009.01) | |
| H04B 1/715 | (2011.01) | |

(52) U.S. Cl.
CPC ............. *H04B 1/713* (2013.01); *H04B 1/715* (2013.01); *H04L 47/14* (2013.01); *H04W 28/04* (2013.01); *H04B 2001/7154* (2013.01)

(58) Field of Classification Search
CPC   H04B 1/713; H04B 2001/7154; H04B 1/715; H04W 28/04; H04L 47/14
See application file for complete search history.

(56) References Cited

U.S. PATENT DOCUMENTS

| | | | |
|---|---|---|---|
| 6,181,684 B1 * | 1/2001 | Turcotte | H04B 7/2643 370/232 |
| 2010/0098043 A1 | 4/2010 | Hafeez et al. | |
| 2013/0258882 A1 * | 10/2013 | Dinan | H04W 52/242 370/252 |
| 2015/0003428 A1 | 1/2015 | Woo et al. | |
| 2016/0295454 A1 * | 10/2016 | Kim | H04B 7/0456 |
| 2020/0107373 A1 * | 4/2020 | Roy | H04L 5/001 |
| 2020/0275244 A1 * | 8/2020 | Lee | G01S 13/876 |
| 2020/0374925 A1 * | 11/2020 | Su | H04B 1/713 |
| 2021/0092065 A1 | 3/2021 | Piikivi | |

FOREIGN PATENT DOCUMENTS

| | | |
|---|---|---|
| WO | WO-2013071993 A1 | 5/2013 |
| WO | WO-2014141005 A1 | 9/2014 |

OTHER PUBLICATIONS

Search Report dated Feb. 5, 2020 for PCT Application No. PCT/GB2019/053147, 14 pages.
Combined Search and Examination Report under Sections 17 and 18(3) dated Jan. 29, 2020 for Great Britain Application No. 1913808.0, 7 pages.

\* cited by examiner

*Primary Examiner* — Omar J Ghowrwal
(74) *Attorney, Agent, or Firm* — Patterson Thuente Pedersen, P.A.

(57) ABSTRACT

Provided is a machine-implemented method to send data from an electronic device, comprising positioning transmission of a packet in a channel slot preferred zone of a channel slot instance according to a statistical profile of at least one component of message flow in a network over which the packet is to be transmitted. The method may determine a statistical profile of components of the message flow and select at least one statistical profile as a basis for composing the channel slot preferred zone. The components of the message flow may comprise a sender electronic device, a network, a packet for transmission, a recurring channel slot and a receiver electronic device.

20 Claims, 6 Drawing Sheets

Method 100

Recurring channels slot timing 300

Channel slot instance 302

*Timing information recent*

Channel slot instance 304

*Timing information beginning to age*

Channel slot instance 306

*Timing information aged*

FIG. 3

Average packet size 400

Channel slot instance 402

*Normal packet size*

Channel slot instance 404

*Slight overflow of previous large packet*

Channel slot instance 406

*Significant overflow of previous large packet*

Current packet size for multicast 600

Channel slot instance 602

*Large packet*

Channel slot instance 604

*Smaller packet*

Channel slot instance 606

*High network load -- any packet size*

FIG. 6

POSITIONING TRANSMISSION OF A PACKET

The present technology is directed to the control of packet transmission in channel-hopping (also called frequency-hopping or frequency-hopping spread spectrum) networks.

In channel-hopping networks, a sender or receiver device switches from channel to channel (frequency to frequency) in a predetermined manner, allocating certain periods of time (slots) to each channel. Thus, a pattern is established comprising channel switches and channel slots, forming a pattern of recurring channel slot instances, each channel slot instance lasting for a period of time during which one or more signal packets may be sent or received.

As will be clear to one of skill in the art, a number of factors concerning the several components of a message flow between a sender and a receiver may affect the efficacy of packet transmission in such networks, and these factors typically vary in their effects depending on, among other things, the position between the start and end bounds of a channel slot at which a packet transmission is attempted. Components of a message flow include, for example, the sender device, the message packet itself, the transmission channel and the receiver device.

In a first approach to the many difficulties encountered in packet transmission in channel-hopping networks, the present technology provides a machine-implemented method to send data from an electronic device, comprising positioning transmission of a packet in a channel slot preferred zone of a channel slot instance according to a statistical profile of at least one component of message flow in a network over which the packet is to be transmitted.

In a hardware approach, there is provided electronic apparatus comprising logic elements operable to implement the methods of the present technology. In another approach, the computer-implemented method may be realised in the form of a computer program product, tangibly stored in a non-transient storage medium, and operable in use to cause a computer system to perform the process of the present technology.

Implementations of the disclosed technology will now be described, by way of example only, with reference to the accompanying drawings, in which.

As described above, a number of factors concerning the several components of a message flow between a sender and a receiver may affect the efficacy of packet transmission in channel-hopping networks, and these factors typically vary in their effects depending on, among other things, the position between the start and end bounds of a channel slot at which a packet transmission is attempted. "Message flow" is used here and throughout the present publication in the sense of the set of hardware, firmware and software components that comprise a message (such as a packet), a message source, a message destination and a message transmission channel. Clearly, the characteristics and behaviour of each component of a message flow can affect the efficacy of packet transmission.

The behaviour of the transmission channel and the receiver device around channel switches, for example, can affect the optimal time to send packet to a receiver. For example, it is often not optimal to send packets at the beginning of a channel slot or immediately after forwarding becomes possible. Also, in the case where there is sufficient time in a channel slot to send multiple packets, it may be preferable to distribute the packets across the channel slot, rather than concentrating them together, but still to select a preferred zone of the channel slot instance and avoid less-preferred zones if possible.

In the case of synchronized channel sequences, the sending of a packet immediately after a channel switch may result in packet loss because of packet collisions, which can result in one or more retries of the transmission until the packet is successfully sent. In networks that suffer from any sort of resource constraint, such as, for example, many low-power networks, such as IPv6 over Low-Power Wireless Personal Area Network (6loWPAN) arrangements, it is preferable to avoid the waste of resources that retries entail. In a Wireless Smart Utility Network (WI-SUN™) arrangement, for example, this difficulty arises for broadcast message transmissions, because WI-SUN™ provides for synchronized broadcast. Other networks may also suffer from this difficulty in unicast cases, because they also provide synchronized unicast channels.

In the case of a channel-hopping system that does not have synchronised channel sequences, the destination device might have just changed its scheduled channel or be close to changing its scheduled channel, and this can cause the packet to be lost.

It will be clear to one of skill in the art that many other factors may play a part in affecting the efficacy of the message flow components at any point in the period of time occupied by a channel slot: the message sender device's capabilities, the network load, the nature of the current or average transmission packet, the characteristics of the recurring channel slot and the capabilities of the receiver device, for example. In one example, the timing information for a channel slot made available by a receiver to a sender may "drift" over time—that is, the information may lose its accuracy over time since its last clock synchronization—and when the timing information at the beginning and ending of the slot is inaccurate, any signal may become lost or distorted by timing jitter and channel noise. In another example, repeated receipt of large packets may cause overflows that can adversely affect the start of a channel slot.

The present technology thus provides computer-implemented techniques and logic apparatus for controlling packet transmission in channel-hopping networks, especially by distributing packet transmissions inside channel slots based on analysis of network statistics to improve the robustness of transmission.

The present technology thus calculates at the sender electronic device a preferred statistical zone within the channel slot to send a packet to avoid or reduce the possibility of a collision or other packet error and to optimize the channel usage between multiple devices based on network statistics from the message flow components in the network. In one implementation, if the current slot preferred zone cannot accommodate the packet size, a preferred zone in a subsequent instance of the recurring channel slot may be used.

Figure 1:
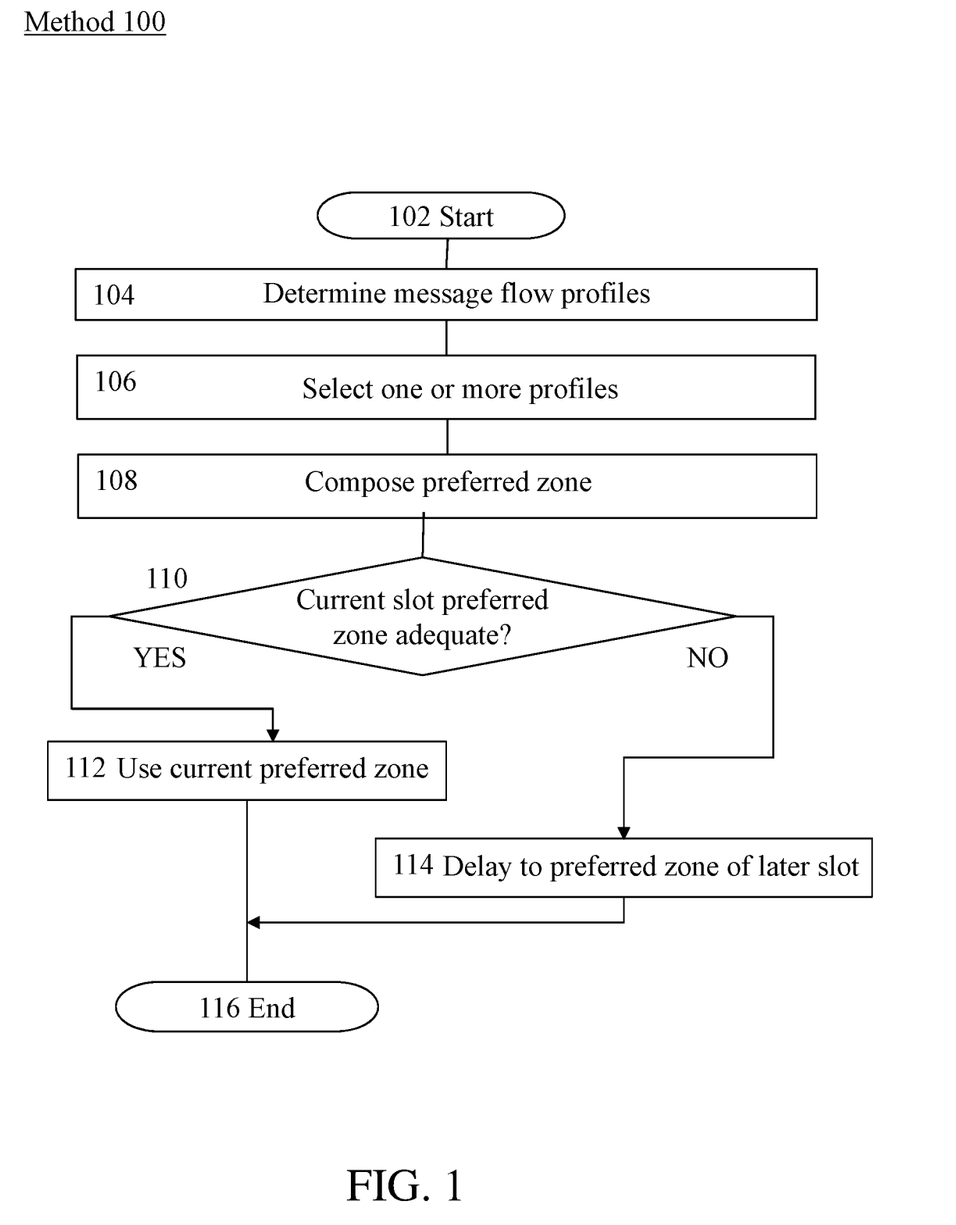
FIG. 1 shows a method of operation of an electronic apparatus to control packet transmission in a channel-hopping network.

Turning now to FIG. 1, there is shown a method 100 of operation of an electronic apparatus to control packet transmission in a channel-hopping network, commencing at Start 102. At 104, statistical profiles of components of the message flow are determined, the components comprising the message sender device's capabilities, the network load, the nature of the current or average transmission packet, the characteristics of the recurring channel slot and the capabilities of the receiver device, for example.

It will be understood by one of skill in the art that the statistical profiles of components of the message flow may be derived in various ways. For example, non-invasive tooling of a packet queue can provide packet sizing of individual packets and can also provide average packet sizing, while various monitors are conventionally available for providing device performance and network load and performance statistics. Sender and receiver device capabilities can be derived, for example, by interrogating configuration data. Channel timing decay data can be estimated, for example, from the elapsed time since synchronization or on the basis of transmission failure and retry detection statistics.

At 106, one or more of the profiles are selected to act as the basis for further processing. If a single profile is selected, step 108 composes a preferred zone in the channel slot for sending a packet, based on the statistical profile—for example, if the statistical profile shows that it is preferable to locate the preferred zone early in the lifetime of the channel slot, that profile is used alone. If plural statistical profiles are selected at 106, the profiles may be processed according to rules governing their combination in composing the preferred zone at 108, thus taking into account a number of the factors that may influence the efficiency of the message flow. The rules may, for example, provide relative weights for the various factors so that those factors having the greatest probability of causing packet transmission failures will have greater influence over the composition of the preferred zone over those factors having a lesser probability of causing failures.

In one implementation, a further test is made on the current channel slot at 110. If the preferred zone composed at 108 will adequately accommodate the packet to be sent, the current preferred zone is used to send the packet at 112. If the preferred zone composed at 108 will not adequately accommodate the packet to be sent (for example, because the remaining time in the preferred zone is not long enough for the current packet to be sent), the sending of the packet is delayed at 114. In either case, the present method completes at End 116.

Figure 2:
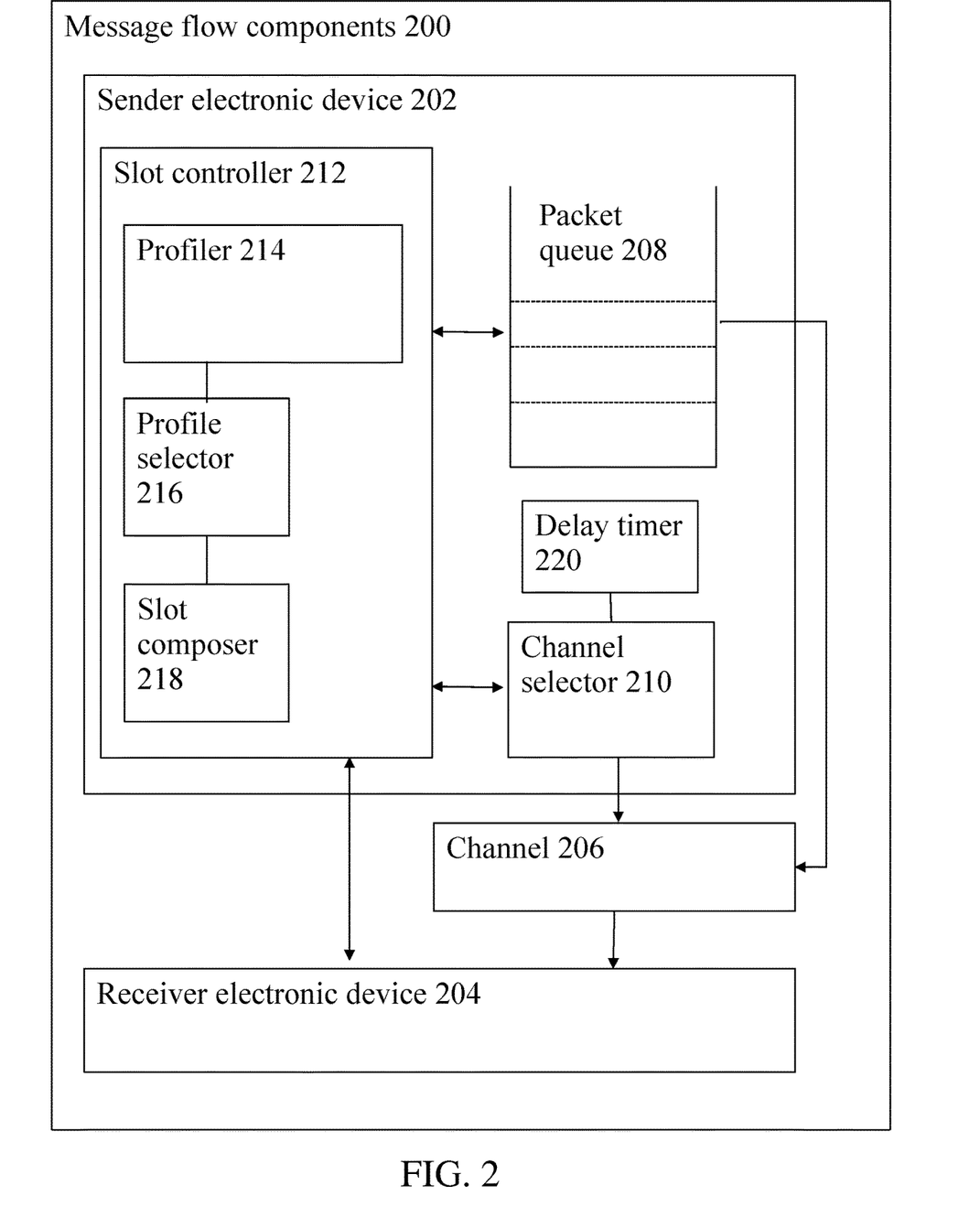
FIG. 2 shows a block diagram of an arrangement of logic, firmware or software components, or any combination thereof, by means of which the presently described technology may be implemented.

Turning now to FIG. 2, the method described above may be implemented in hardware, software or firmware elements of a sender electronic device 202 forming part of a set of message flow components 200, the set of message flow components 200 further including a network channel 206 operatively coupled to sender electronic device 202 and to receiver electronic device 204. Sender electronic device comprises a packet queue 208, which may form part of a transceiver element (not shown), which may be of any of the well-known transceiver elements suitable for sending packets over channel 206 of a network. A conventional packet queue typically accommodates fixed or variable-sized packets for transmission over a suitable network. In an exemplary instance, packet queue 208 contains variable-sized packets, and the average and current packet sizes may represent one factor in the efficiency of the operation of the message flow.

Because sender electronic device 202 and receiver electronic device 204 use a channel-hopping technique, each packet from packet queue 208 passes through channel 206 selected by channel selector 210. Channel selector 206 at sender electronic device is operable to follow a predetermined pattern of channel switching, and is paralleled by a functionally-equivalent component (not shown for simplicity) at receiver electronic device 204.

Sender electronic device 202 according to the presently-disclosed technology is further provided with slot controller 212, arranged in electronic communication with receiver electronic device 204, packet queue 208 and channel selector 210, in addition to its internal connection to sender electronic device 202 and through sender electronic device 202 to the wider processing and network environment. Slot controller 212 comprises profiler 214, which establishes statistical profiles derived from data acquired from at least one of packet queue 208, receiver electronic device 204, channel selector 210, and other sources—other sources may include, for example, the sender electronic device 202, but may also include any of the components of the network or its other attached devices that can have an effect on the efficacy of packet transmission over channel 206. Profiler 214 supplies its statistical profile or profiles to profile selector 216. In cases in which only a single profile is created, the function of profile selector 216 is fixed. In cases in which plural profiles are created, profile selector 216 may be provided with rules according to which one or more profiles may be selected, and in implementations further rules may be provided for the weighting and combining of profiles as input to slot composer 218. Slot composer 218, on the basis of the statistical profiles supplied by profile selector 218, composes a preferred zone of the channel slot—one in which the best available opportunity is given for a packet to be transmitted within the bounds of the channel slot. The preferred zone information provided by slot composer 218 enables slot controller 212 to provide input to channel selector 210 and packet queue 208 to control the sending of the current packet over channel 206. The preferred zone information, together with information held by channel selector 210 and packet queue 208, may further be used to determine that the current channel slot instance of channel 206 is unsuitable for the transmission of the current packet, and may thus invoke delay timer 220 to delay transmission until the start of a preferred zone in a subsequent channel slot instance of channel 206.

Thus, at its broadest, the present technology provides that one or more different factors relating to the network can be used by a sender electronic device to assess, statistically, the operational characteristics of the message flow components in the network and to use that to control when, within a channel slot, packets should be sent. This is achieved by positioning the transmission of a packet in a channel slot preferred zone of a channel slot instance according to a statistical profile of at least one component of message flow in a network over which said packet is to be transmitted. To achieve this end, the present technology is operable to determine at least one statistical profile of at least one component of a message flow and select at least one said statistical profile for composing the channel slot preferred zone. As described above, the components of said message flow comprise, for example, a sender electronic device, a network, a packet for transmission, a recurring channel slot and a receiver electronic device. In an implementation, the selection process can include rank-based selecting of statistical data for at least one of the sender electronic device, the network, the packet for transmission, the recurring channel slot and the receiver electronic device, according to a ranking schema. The process can also combine a plurality of instances of statistical data for at least two of the message flow components. In one implementation, responsive to a determination that the channel slot preferred zone of a current channel slot instance cannot accommodate the packet before expiry of the instance, the present technology also allows for deferring the sending of the packet until a start of a preferred zone of a subsequent channel slot instance.

As described above, a number of different statistical analyses can be used to model a channel slot, and examples of these are presented below, with reference to the drawings as appropriate.

Figure 3:
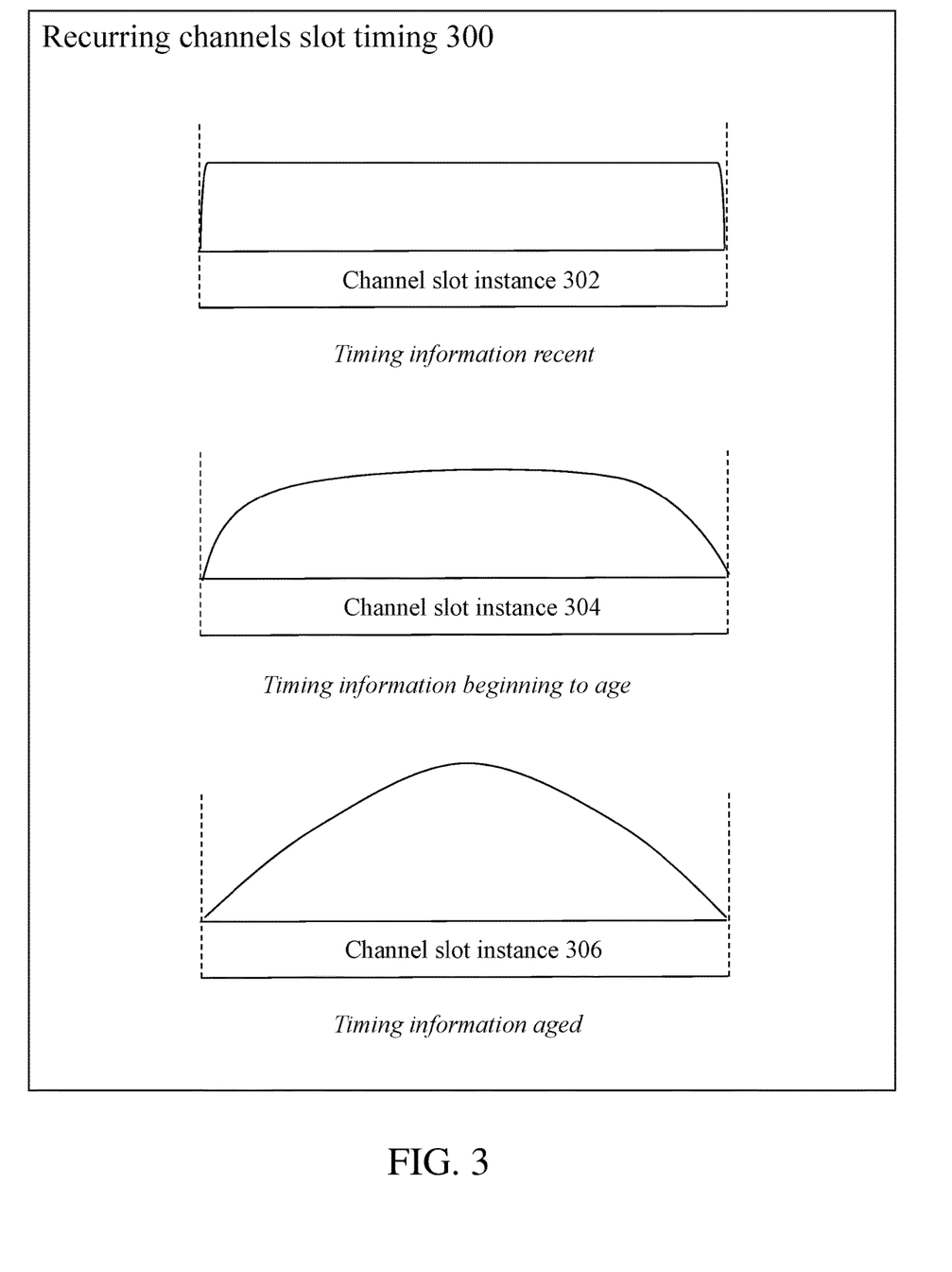
FIG. 3 shows the effect of timing drift as a factor in statistical profiling of a channel slot.

In FIG. 3, for example, three states of a channel slot instance are shown in various states of timing drift at the receiver device. The most effective distribution of transmission times within the slot can be determined in this case based on the estimated clock timing drift. In the first exemplary channel slot instance 302, the timing information received by the sender device from the receiver device is recent—the receiver's channel slot clock has been recently synchronized, and thus nearly the entire slot is available for effective packet transmission. As the timing information ages in instance 304, the early and late stages of the channel slot instance show reduced efficacy, culminating at instance 306, in which the timing information has aged sufficiently that only the central portion of the channel slot instance is effective. In 304 and 306, a packet distribution based on a preferred zone could mitigate against potential collisions by decreasing the amount of transmission at the edges of the slot and concentrating the transmissions towards the centre of the slot to compensate for the clock drift. Thus, broadly, when a sender device has recent information about the receiver device's timing, packets can be sent close to the start and end of a channel slot, but as timing information becomes older, the estimate of clock drift must increase, and thus the preferred transmission time moves closer to the centre of the channel slot. When new timing information from the receiver device is received by the sender device, the preferred zone may again be allowed to expand closer to the start and end of the channel slot.

Figure 4:
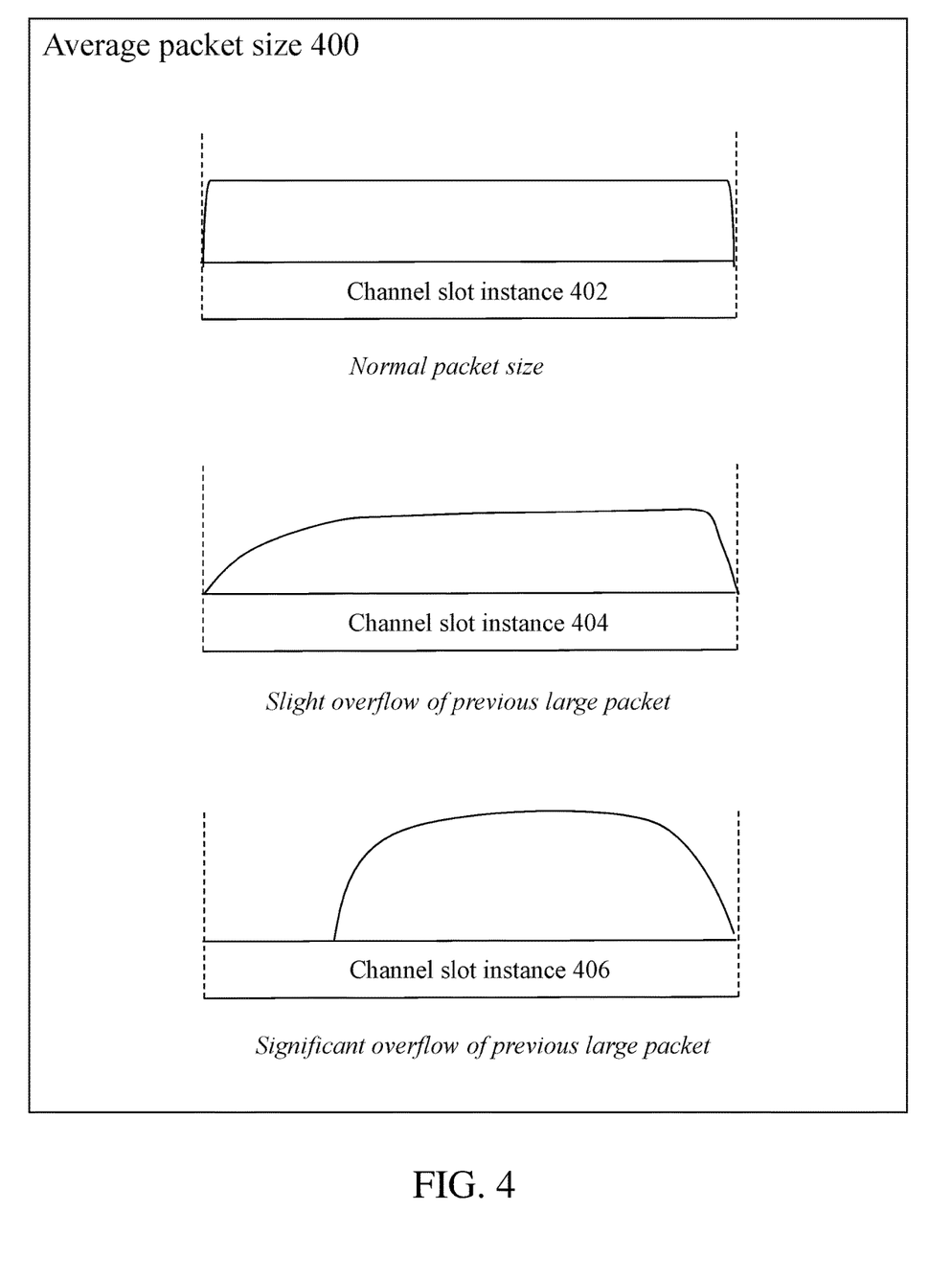
FIG. 4 shows the effect of average packet size as a factor in statistical profiling of a channel slot.

In FIG. 4 are shown three exemplary states of a channel slot during transmission of packets averaging differing sizes. At 402 can be seen a channel slot instance as it performs when packet sizes are normal with reference to the channel slot size. At 404 is shown the effect of a slight overflow of a previous packet that was larger than normal, and at 406, the effect of significant overflow of a previous large packet. Where the packet size is high, there is a higher probability that the receiver device is still receiving a packet from the previous channel which has prevented the channel switch at the receiver, thus affecting its ability to receive a new packet. In 404 and 406, a preferred zone based on current average packet size according to the present technology could be used to distribute transmission times within channel slots to mitigate the effects of large packet overflows by, for example, starting transmissions earlier in each slot instance. In one implementation, where a preferred zone of a current channel slot has already been partially used and thus cannot accommodate a further large packet, transmission may be delayed to the start of a subsequent channel slot, as described earlier.

Figure 5:
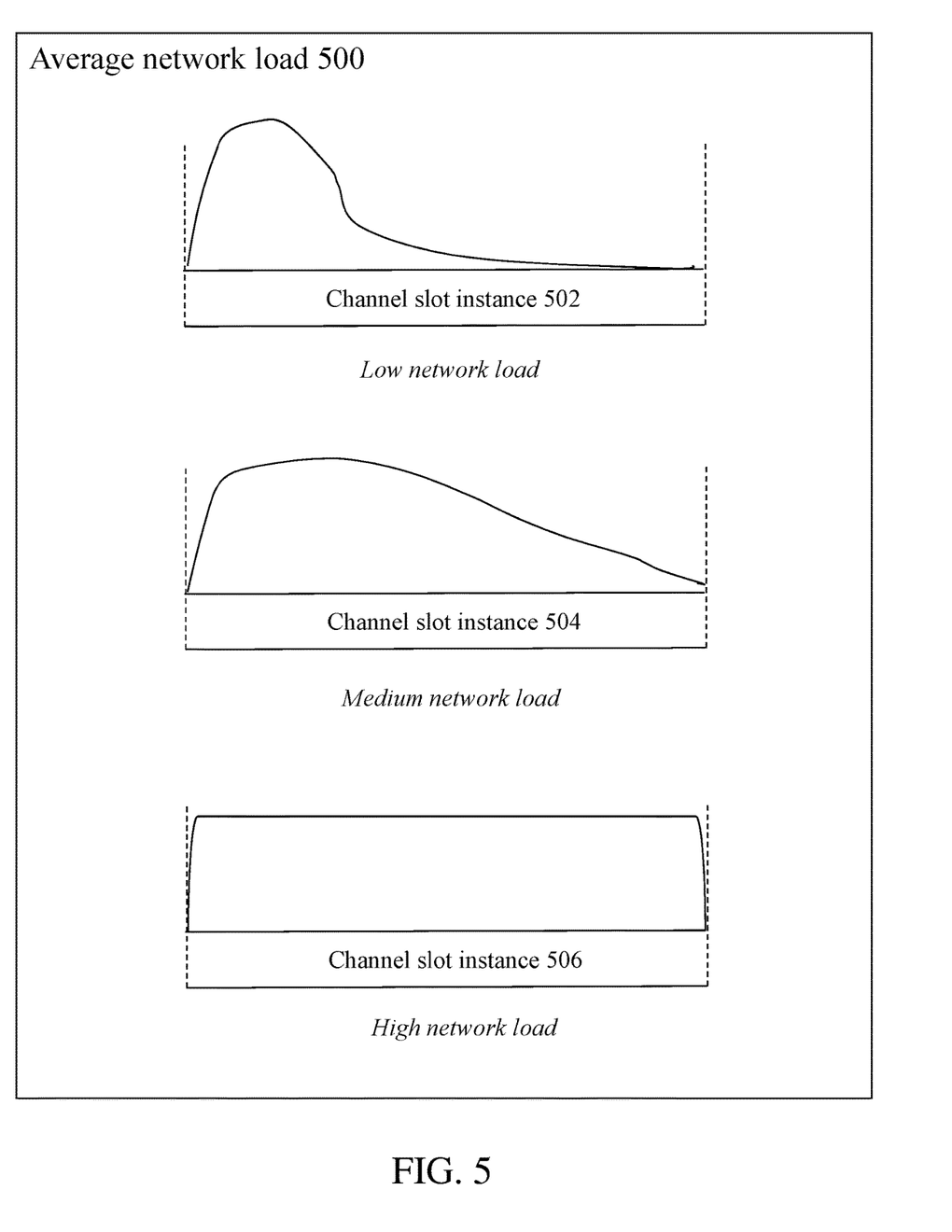
FIG. 5 shows the effect of average network load as a factor in statistical profiling of a channel slot.

In FIG. 5, for example, three states of a channel slot instance are shown in various states of average network load. Where the network load is low, as shown at 502, it is preferable that packets be sent at the beginning of a slot to reduce packet forwarding delays. The preferred zone can thus be adjusted to cause the sender device to preferentially use the earlier part of the channel slot instance. As the network load increases, as shown at 504, the preferred zone may expand to also send packets later in the channel slot instance, and when the network load is high, as shown at 506, the full length of the channel slot may be needed to accommodate the number of packets to be sent. The preferred zone for distribution of transmission times within the slot can thus be significantly influenced by the current network load.

Figure 6:
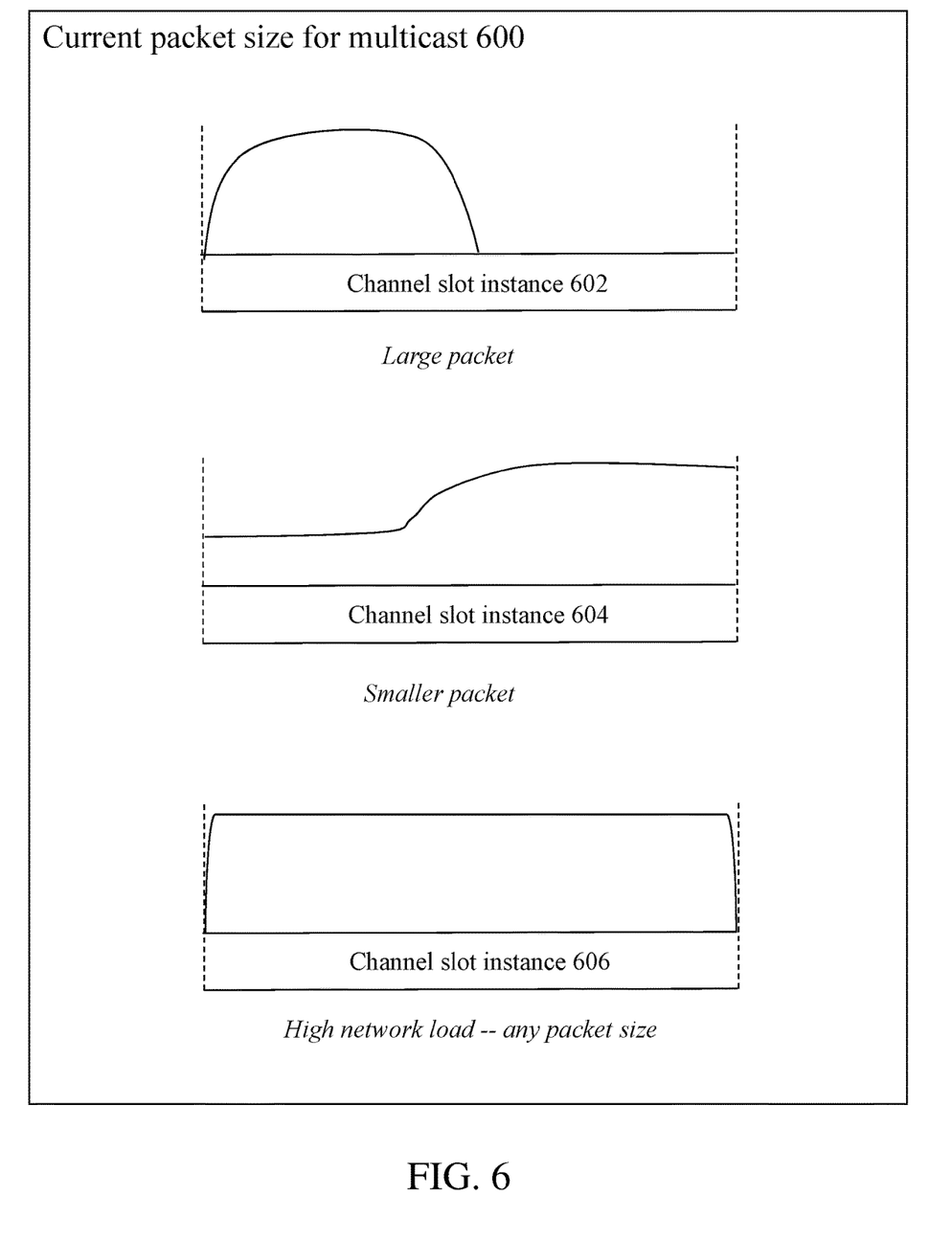
FIG. 6 shows the effect of current packet size as a factor in statistical profiling of a channel slot for multicast transmissions.

In FIG. 6 is shown the manner in which the size of current packet in multicast slots can be taken into account in determining the preferred zone within a channel slot. At 602, for example, the current packet is large, and thus it is preferable to transmit it early in the channel slot instance to prevent any delay in the channel switch. At 604, smaller packets are to be sent, and thus the later part of the channel slot may be used, as there is less likelihood that an overrun will occur and cause a delayed channel switch. At 604, however, a high network load means that the preferred zone must be expanded to include as much as possible of the channel slot, this necessity overriding the packet size factor.

In one implementation for sending a packet over a broadcast channel, all the statistics may be combined, for example, by multiplying them together and calculating a weighting to give the preferred transmission time of the packet within the channel slot. In one implementation, computer code to determine the preferred transmission time may further comprise rules engine code to weight each of a plurality of instances of the statistical data. When sending to a unicast destination, a similar algorithm can provide a range which may be used to determine the optimal delay in transmitting the current packet, taking into account the current position in the channel slot instance.

As will be appreciated by one skilled in the art, the present technique may be embodied as a system, method or computer program product. Accordingly, the present technique may take the form of an entirely hardware embodiment, an entirely software embodiment, or an embodiment combining software and hardware. Where the word "component" is used, it will be understood by one of ordinary skill in the art to refer to any portion of any of the above embodiments.

Furthermore, the present technique may take the form of a computer program product tangibly embodied in a non-transient computer readable medium having computer readable program code embodied thereon. A computer readable medium may be, for example, but is not limited to, an electronic, magnetic, optical, electromagnetic, infrared, or semiconductor system, apparatus, or device, or any suitable combination of the foregoing.

Computer program code for carrying out operations of the present techniques may be written in any combination of one or more programming languages, including object-oriented programming languages and conventional procedural programming languages.

For example, program code for carrying out operations of the present techniques may comprise source, object or executable code in a conventional programming language (interpreted or compiled) such as C, or assembly code, code for setting up or controlling an ASIC (Application Specific Integrated Circuit) or FPGA (Field Programmable Gate Array), or code for a hardware description language such as Verilog™ or VHDL (Very high speed integrated circuit Hardware Description Language).

The program code may execute entirely on the user's computer, partly on the user's computer and partly on a remote computer or entirely on the remote computer or server. In the latter scenario, the remote computer may be connected to the user's computer through any type of network. Code components may be embodied as procedures, methods or the like, and may comprise sub-components which may take the form of instructions or sequences of instructions at any of the levels of abstraction, from the direct machine instructions of a native instruction-set to high-level compiled or interpreted language constructs.

It will also be clear to one of skill in the art that all or part of a logical method according to embodiments of the present techniques may suitably be embodied in a logic apparatus comprising logic elements to perform the steps of the method, and that such logic elements may comprise components such as logic gates in, for example a programmable logic array or application-specific integrated circuit. Such a logic arrangement may further be embodied in enabling elements for temporarily or permanently establishing logic structures in such an array or circuit using, for example, a virtual hardware descriptor language, which may be stored using fixed carrier media.

In one alternative, an embodiment of the present techniques may be realized in the form of a computer implemented method of deploying a service comprising steps of deploying computer program code operable to, when deployed into a computer infrastructure or network and executed thereon, cause said computer system or network to perform all the steps of the method.

In a further alternative, an embodiment of the present technique may be realized in the form of a data carrier having functional data thereon, said functional data comprising functional computer data structures to, when loaded into a computer system or network and operated upon thereby, enable said computer system to perform all the steps of the method.

It will be clear to one skilled in the art that many improvements and modifications can be made to the foregoing exemplary embodiments without departing from the scope of the present technique.

The invention claimed is:

1. A machine-implemented method to send data from an electronic device, comprising:
   causing a data packet to be transmitted in a preferred zone defined within bounds of a continuous channel slot instance of a single frequency, wherein the preferred zone is determined according to a statistical profile of at least one component of message flow in a channel-hopping network over which said data packet is transmitted.

2. The machine-implemented method according to claim 1, further comprising:
   determining at least one statistical profile of at least one component of said message flow.

3. The machine-implemented method according to claim 1, further comprising:
   selecting at least one said statistical profile for composing said preferred zone.

4. The machine-implemented method according to claim 1, said at least one component of said message flow comprising at least one of a sender electronic device, a network, a packet for transmission, a recurring channel slot and a receiver electronic device.

5. The machine-implemented method according to claim 2, said determining at least one statistical profile comprising determining statistical data for at least one of said sender electronic device, said network, said packet for transmission, said recurring channel slot and said receiver electronic device.

6. The machine-implemented method according to claim 3, said selecting at least one said statistical profile comprising selecting according to statistical data for at least one of said sender electronic device, said network, said packet for transmission, said recurring channel slot and said receiver electronic device.

7. The machine-implemented method according to claim 3, said selecting further comprising rank-based selecting of statistical data for at least one of said sender electronic device, said network, said packet for transmission, said recurring channel slot and said receiver electronic device according to a ranking schema.

8. The machine-implemented method according to claim 3, said selecting at least one said statistical profile for composing said preferred zone comprising combining a plurality of instances of statistical data for at least two of said sender electronic device, said network, said packet for transmission, said recurring channel slot and said receiver electronic device.

9. The machine-implemented method according to claim 8, said combining a plurality of instances of statistical data further comprising operating a rules engine to weight each of said plurality of instances.

10. The machine-implemented method according to claim 1, further comprising, responsive to a determination that said preferred zone of a current said channel slot instance cannot accommodate said packet before expiry of said instance, deferring sending said packet until a start of a said preferred zone of a subsequent channel slot instance.

11. An electronic sender device comprising processing circuitry and instructions that, when executed on the processing circuitry, cause the processing circuitry to cause a data packet to be transmitted in a preferred zone defined within bounds of a continuous channel slot instance of a single frequency, wherein the preferred zone is determined according to a statistical profile of at least one component of message flow in a channel hopping network over which said packet is transmitted.

12. The electronic sender device according to claim 11, wherein the instructions further cause the processing circuitry to determine at least one statistical profile of at least one component of said message flow and to select at least one said statistical profile for composing said preferred zone.

13. A non-transitory computer readable medium having computer readable program code embodied thereon, said computer readable program code being operable, when loaded into a computer and executed thereon, to cause said computer to cause a data packet to be transmitted in a preferred zone defined within bounds of a continuous channel slot instance of a single frequency, wherein the preferred zone is determined according to a statistical profile of at least one component of message flow in a channel-hopping network over which said packet is transmitted.

14. The non-transitory computer readable medium according to claim 13, further comprising computer program code to determine at least one statistical profile of at least one component of said message flow and to select at least one said statistical profile for composing said preferred zone.

15. The non-transitory computer readable medium according to claim 13, said at least one component of said message flow comprising at least one of a sender electronic device, a network, a packet for transmission, a recurring channel slot and a receiver electronic device.

16. The non-transitory computer readable medium according to claim 14, said computer program code to determine at least one statistical profile comprising computer program code to determine statistical data for at least one of said sender electronic device, said network, said packet for transmission, said recurring channel slot and said receiver electronic device.

17. The non-transitory computer readable medium according to claim 14, said computer program code to select at least one said statistical profile comprising computer program code to select according to statistical data for at least one of said sender electronic device, said network, said packet for transmission, said recurring channel slot and said receiver electronic device.

18. The non-transitory computer readable medium according to claim 14, said computer program code to select further comprising computer program code for rank-based selecting of statistical data for at least one of said sender electronic device, said network, said packet for transmission, said recurring channel slot and said receiver electronic device according to a ranking schema.

19. The non-transitory computer readable medium according to claim 14, said computer program code to select at least one said statistical profile for composing said preferred zone comprising computer program code to combine a plurality of instances of statistical data for at least two of said sender electronic device, said network, said packet for transmission, said recurring channel slot and said receiver electronic device.

20. An electronic device comprising processing circuitry and instructions that, when executed on the processing circuitry, cause the processing circuitry to:

cause a data packet to be transmitted in a preferred zone defined within bounds of a continuous channel slot instance of a single frequency, wherein the preferred zone is determined according to a statistical profile of at least one component of message flow in a channel-hopping network over which said data packet is transmitted.

* * * * *